United States Patent [19]

Lammers

[11] Patent Number: 5,532,528
[45] Date of Patent: Jul. 2, 1996

[54] CONVERTER INCLUDING DIRECT CURRENT DETECTION

[75] Inventor: Franciscus H. T. Lammers, Eindhoven, Netherlands

[73] Assignee: U.S. Philips Corporation, New York, N.Y.

[21] Appl. No.: 442,601

[22] Filed: May 17, 1995

Related U.S. Application Data

[63] Continuation of Ser. No. 861,683, Apr. 1, 1992, abandoned.

[30] Foreign Application Priority Data

Apr. 4, 1991 [EP] European Pat. Off. ............ 91200779

[51] Int. Cl.⁶ .......................... H02M 7/217; G05F 1/70; G05F 1/613
[52] U.S. Cl. ............................ 307/125; 363/89; 363/46; 323/222
[58] Field of Search .................. 363/16, 10, 24, 363/25, 26, 34, 37, 133, 134, 89; 323/222, 224, 282, 283, 285; 307/125, 141

[56] References Cited

U.S. PATENT DOCUMENTS

| | | | |
|---|---|---|---|
| 4,101,809 | 7/1978 | Morais | 315/156 |
| 4,792,887 | 12/1988 | Bernitz et al. | 363/89 |
| 4,801,859 | 1/1989 | Dishner | 323/224 |
| 4,812,736 | 3/1989 | Albach et al. | 323/224 |
| 4,888,524 | 12/1989 | Ganser et al. | 315/200 |
| 4,940,929 | 7/1990 | Williams | 323/222 |
| 5,168,237 | 12/1992 | Fieau et al. | 324/542 |
| 5,181,159 | 1/1993 | Peterson et al. | 363/89 |
| 5,224,025 | 6/1993 | Divan et al. | 363/16 |

*Primary Examiner*—Peter S. Wong
*Assistant Examiner*—Aditya Krishnan
*Attorney, Agent, or Firm*—Laurie E. Gathman

[57] ABSTRACT

A circuit arrangement which is provided with an up-converter (3) which comprises at least an inductive device (31), a switch (32), and a capacitive device (34) which in the operational state is periodically charged with a charging current in dependence on periodic switching of the switch. The switch is switched to the conducting state periodically during a substantially constant time $t_{on}$. The circuit arrangement is provided with detection circuitry (I) for direct detection of the charging current. As a result, a load current which has a sinusoidal shape by good approximation is drawn from a connected AC voltage supply source by the circuit arrangement.

33 Claims, 1 Drawing Sheet

CONVERTER INCLUDING DIRECT CURRENT DETECTION

This is a continuation of application Ser. No. 07/861,683 filed Apr. 1, 1992 now abandoned.

BACKGROUND OF THE INVENTION

The present invention is directed generally to a circuit arrangement and, in particular to a circuit arrangement provided with an up-converter which comprises at least an inductive means and switching device a, a capacitive device which in the operational state of the circuit arrangement is periodically charged with a charging current in dependence on periodic switching of the switching device by a drive circuit, the switching device means being switched to the conducting state periodically for a substantially constant time $t_{on}$.

A circuit arrangement of the kind mentioned in the opening paragraph is known from DE-OS 26 52 275 and may effectively serve, for example, for operating a discharge lamp in conjunction with current stabilization device. By choosing the moment at which the switching device is switched to the conducting state so as to coincide with the moment the current through the inductive device becomes zero, it is possible to ensure that the load current drawn from the supply source by the circuit arrangement, in the case of operation of the circuit arrangement on a usual sinusoidal AC voltage supply source, is also sinusoidal by good approximation. In general, the current drawn from the supply source will assume a shape corresponding by good approximation to that of the supply voltage during such operation of the known circuit arrangement. A further advantage of the known circuit arrangement is that switching-on of the switching device takes place at the moment at which no current is flowing, so that switching losses are limited. Practical realization, however, leads to a comparatively high degree of intricacy of the drive circuit.

SUMMARY OF THE INVENTION

The invention has for its object inter alia to provide a measure by which a considerable simplification of a drive circuit of a circuit arrangement mentioned in the opening paragraph is possible.

Another object of the invention is to provide a simplified circuit arrangement with detection circuitry to prevent switching-on of the switching device when charging current is directly detected.

A further object of the invention is to provide a drive circuit which controls the switching device substantially independent of the supply source signal.

Yet another object of the invention is to provide a current limitation device which will limit the current through the switching device by causing a voltage across the detection circuitry.

Generally speaking, in accordance with the present invention, a circuit arrangement of the kind mentioned in the opening paragraph is provided with a detection circuitry for direct detection of the charging current, and accordingly a considerable simplification of a drive circuit arrangement which prevents switching of the switch device when a charging current is present is provided.

By detecting of the charging current, the construction of the drive circuit may essentially be limited to a signal generator which generates a signal of a fixed time duration $t_{on}$ for rendering and keeping the switching device conducting during the presence of the signal, the signal generator being driven by a signal derived from the detection circuitry. This can be realized in a very simple and reliable manner by use of standard electronic components. An example of such a signal generator is a monostable multivibrator.

In an advantageous embodiment, the detection circuitry is formed by a rectifier device. The voltage difference across the rectifier device in the presence of the charging current can be directly used as a blocking voltage for blocking the signal generator.

The invention renders it particularly simple to realize a current limitation in that a current limitation device is provided which causes a portion of the current to flow through the detection circuitry in the case of a current strength through the switching device above an admissible threshold, so that a voltage arises across the detection circuitry which can serve as a blocking voltage for the switching device.

An up-converter is fed with a DC voltage. In practice, this is often realized by full-wave rectification of the AC voltage of a public supply. The rectification generally takes place with a rectifier bridge built up from semiconductors, possibly provided with a filter capacitor. When the supply source voltage drops, the periodic switching of the switching device will show a strongly increased frequency. This will occur, for example, during a period surrounding a phase change of the AC voltage. An increase in the switching frequency, however, leads to an increase in the switching losses. It is advantageous, therefore, to provide the drive circuit with circuitry which blocks the signal generator during a fixed time $t_{off}$. A limitation of the switching frequency of the switching device is achieved without the shape of the current drawn from the supply source being substantially influenced.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
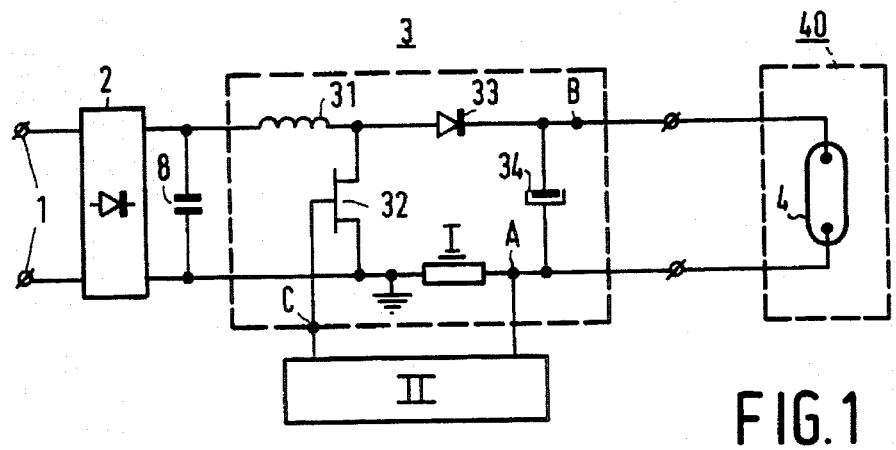
FIG. 1 is a diagram of the circuit arrangement provided with an up-converter.

Reference is first made to FIG. 1, wherein reference numeral 1 denotes connection terminals for connecting the circuit arrangement to a supply source. An up-converter 3 is connected by to a rectifier circuit 2 known per se (for example, a diode bridge) and a filter capacitor 8. A load branch 40 provided with an electric load in the form of a lamp 4 is connected to the up-converter. The load branch comprises a current stabilizer device which is not shown in any detail. The up-converter includes a capacitive device 34 which is charged with a charging current from the supply source connected at 1 via an induction device 31 and a rectifier device 33, in dependence on periodic switching of a switching means 32. The switching device 32 is switched periodically by a drive circuit II, and is thus switched to the conducting state periodically during a substantially constant time $t_{on}$. The up-converter 3 is, in addition, provided with detection circuitry I for direct detection of the charging current. The detection circuitry is are connected to the drive circuit II at A.

Figure 3:
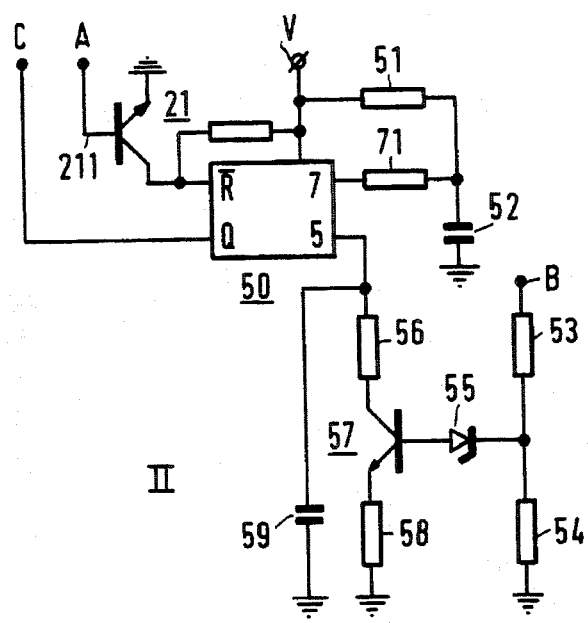
FIG. 3 is a detailed view of a signal generator forming part of the circuit arrangement of FIG. 1.

The drive circuit is shown in more detail in FIG. 3. The core of the drive circuit is formed by a signal generator 50 in the form of an integrated circuit (IC). A very suitable IC for this purpose is the standard IC of the type LMC 555, which is constructed as a monostable multivibrator. An output Q of IC 50 supplies pulses of a constant time duration $t_{on}$ by which the switching device is rendered and kept conducting periodically. A connection point R, which is a reset gate of the IC, is connected to a driven switch 21 of which a gate electrode 211 is connected to point A of the detection circuitry. As long as the capacitive device 34 is being charged by a charging current, the signal coming from the detection device will keep the switch 21 conducting. The detection signal in this way serves as a blocking voltage for blocking the signal generator and thus the generation of a pulse with time duration $t_{on}$ at output Q.

Figure 2:
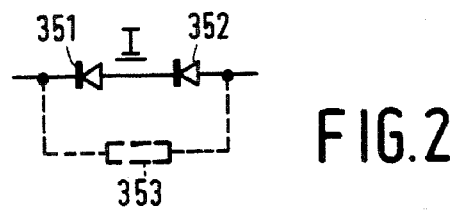
FIG. 2 is a detailed picture of detection circuitry which forms part of the circuit arrangement of FIG. 1.

Two diodes 351 and 352 are used as the detection device I in the present example, as shown in FIG. 2. Generally, the number of diodes used for the detection circuitry I is so chosen that there is a greater voltage differential across them while a charging current is flowing than the required base-emitter voltage of the switch 21 which is constructed as a transistor.

The signal generator 50 shown in FIG. 3 is equipped with a device for blocking the signal generator during a fixed time $t_{off}$. An auxiliary voltage V, which also serves as a supply for the IC is for this purpose connected via a voltage divider 51, 52 to gate 7 of the IC, in which connection to an impedance 71 is included. The value of the impedance 71 in conjunction with 51 and 52 determines the value of the time duration $t_{off}$.

Figure 4:
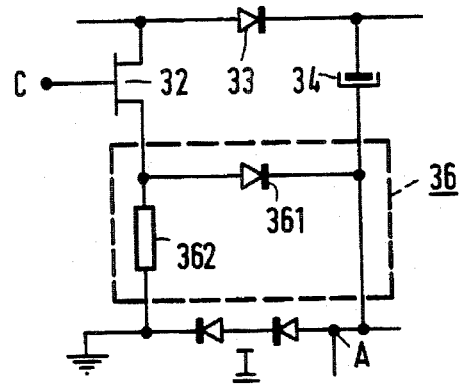
FIG. 4 is a detailed view of a modification of an up-converter suitable for use in the circuit arrangement according to FIG. 1.

In FIG. 4, a modification of the up-converter 3 is shown, wherein the up-converter is provided with current limitation circuitry 36. The current limitation 36 comprises means which ensure that a portion of the current flows through the detection components I when the current strength through switching means 32 rises above an admissible threshold, so that a voltage is created across the detection circuitry which can serve as a blocking voltage of the switching device. For this purpose, the current limitation circuitry 36 comprises a diode 361 which drains off current to the detection circuitry I in dependence on the value of the voltage across an impedance 362 in the circuit of the switching device 32. The detection circuitry I may be provided with an impedance 353 of ohmic character by which the detection sensitivity can be set. If an impedance 353 is used, it should be safeguarded that this is considerably greater than the impedance 362 of the current limitation 36.

In a practical embodiment of the circuit arrangement described, the signal generator 50 is an IC of the LMC 555 type which is constructed as a monostable multivibrator. The switching device 32 of the up-converter is a FET of the BUK 464 type, while the capacitive device 34 has a capacitance of 47 µF. The detection circuitry I is formed of two diodes 351, 352 of the GP 10J type, shunted by a resistor 353 of 100 ohms. The current limitation circuitry 36 is formed of a resistor 362 of 1 ohm and a diode 361 of the BAV 100 type. Switch 21 is a transistor of the BC 847 C type, resistor 71 is a 4.7 kohms, resistor 51 is 33 kohms and capacitor 52 is 270 pF. The circuit arrangement is also provided with a branch 53, 54, 55, 56, 57, 58 and 59 which is connected at one side to pin 5 of generator 50 and at the other side to point B of the up-converter.

The branch 53, 54, 55, 56, 57, 58 and 59 ensures that the voltage across the capacitive device 34 is to a high degree insensitive to both variation in the effective voltage of the supply source and variation in the load current. Switching element 57 is a transistor of the BC 847 C type. The circuit is so dimensioned that the voltage across the capacitive device 34 is 380 V at a rated supply voltage. The voltage across the capacitive device fluctuates by approximately 2% in the case of a fluctuation in the effective supply voltage from 200 to 240 V.

A high-pressure sodium lamp of the PHILIPS SDW 50 type is operated with the described circuit arrangement, which also comprises a down-converter and a commutator. The down-converter serves as a current source and thus supplies the necessary current stabilization. The lamp has a rated power of 54 W and radiates white light with a temperature $T_c$ of 2,500K and a colour rendering index Ra of 82. The circuit arrangement is operated at an AC voltage source of 220 V, 50 Hz.

When the lamp was operated under changing practical conditions, it was found that the distortion of the sinusoidal input current with harmonic frequencies in the frequency range from 50 Hz to 2 kHz caused by the circuit arrangement nowhere exceeded the standard allowance as laid down in the international standard IEC 923 (first edition, 1988). This was true particularly for the harmonic frequencies of 100, 150 and 250 Hz. The results are shown in column A in the table below. It is noted that the filter capacitor 8 has a value of 22 nF, while capacitor 59 has a value of 100 nF. A further improvement was found to be possible when a capacitor of 1.8 nF was used as the capacitor 8, and one of 560 nF for the capacitor 59. The accompanying results for this are shown in column B of the table below.

| Harmonic frequency | Admissible distortion | Measured distortion | |
| --- | --- | --- | --- |
| (Hz) | as per IEC 923 (%) | A (%) | B (%) |
| 100 | 5 | 0 | 0 |
| 150 | 30 | 8 | 3 |
| 250 | 7 | 3 | 1 |
| 350 | 4 | 4 | 1 |
| 450 | 3 | 3 | 1 |

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A circuit arrangement which extracts a sinusoidal load current from a sinusoidal supply source, comprising:

an input for receiving the sinusoidal supply source;

inductive means for exhibiting inductive characteristics;

capacitive means for being charged by a charging current and coupled to said inductive means;

switching means coupled to said capacitive means and switchable between a non-conducting and a conducting state for controlling, respectively, charging and discharging of the capacitive means;

drive means for controlling the switching of said switching means; and detection means coupled to said capacitive means for detecting the charging current through said capacitive means via a voltage drop across said detection means which voltage drop is caused by the charging current flowing from said capacitive means across said detection means, said drive means switching said switching means in dependence on the detection of the charging current through said capacitive means by said detection means.

2. The circuit arrangement in accordance with claim 1, wherein said drive means switches said switching means to the conducting state periodically for a substantially constant time $t_{on}$.

3. The circuit arrangement in accordance with claim 2, wherein said drive means maintains said switching means in the non-conducting state for as long as said detection means detects the charging current through said capacitive means.

4. The circuit arrangement in accordance with claim 3, wherein said drive means includes a current responsive switch switchable to a conductive state and connected to said detection means, said switch switching into the conductive state in response to said detection means detecting the charging current through said capacitive means.

5. The circuit arrangement in accordance with claim 1, wherein said drive means maintains said switching means in the non-conducting state for as long as said detection means detects the charging current through said capacitive means.

6. The circuit arrangement in accordance with claim 1, wherein said drive means includes a current responsive switch switchable to a conductive state and connected to said detection means, said switch switching into the conductive state in response to said detection means detecting the charging current through said capacitive means.

7. A circuit arrangement which extracts a sinusoidal load current from a sinusoidal supply source, comprising:

an input for receiving the sinusoidal supply source;

a rectifier for rectifying the sinusoidal load current;

an up-converter coupled to said rectifier and having inductive means for exhibiting inductive characteristics, capacitive means for storing a charge, said capacitive means being connected to said inductive means, and switching means switchable between a non-conducting state, in which a charging current flows through said capacitive means, and a conducting state, in which the charging current is shunted from said capacitive means;

detection means for detecting the charging current through said capacitive means via a voltage drop across said detection means which voltage drop is caused by the charging current flowing from said capacitive means across said detection means; and drive means for controlling said switching means, said drive means including a signal generator for generating a switching signal of substantially constant time $t_{on}$ for switching and keeping said switching means in the conducting state during the duration of the switching signal, said signal generator being blocked from generating the switching signal as long as said detection means detects the charging current through said capacitive means.

8. The circuit arrangement in accordance with claim 7, further including current limiting means for limiting current through said switching means.

9. The circuit arrangement in accordance with claim 8, wherein said current limiting means redirects a portion of said current from said switching means to said detection means.

10. The circuit arrangement in accordance with claim 9, wherein whenever the current through said switching means is above a predetermined level the portion redirected though said detection means blocks the generation of the switching signal by said signal generator.

11. The circuit arrangement in accordance with claim 10, wherein said detection means includes a diode.

12. The circuit arrangement in accordance with claim 7, wherein said detection means includes a diode.

13. The circuit arrangement in accordance with claim 11, wherein said drive means further comprises means for blocking generation of the switching signal during a substantially constant time $t_{off}$ such that said switching signal is generated by said signal generating means at a frequency substantially independent of the effective voltage of the sinusoidal supply source.

14. The circuit arrangement in accordance with claim 11, wherein said signal generator means includes a monostable multivibrator.

15. The circuit arrangement in accordance with claim 14, wherein said signal generator means includes a reset means for blocking generation of the switching signal, and said detection means directly controls said reset means.

16. The circuit arrangement in accordance with claim 14, wherein said signal generator means directly controls said switching means.

17. A circuit arrangement for driving a gas discharge lamp, said circuit arrangement comprising:

input terminals for receiving an AC input voltage signal;

rectifier means for rectifying the AC input signal;

an up-converter for increasing the voltage of the rectified AC input signal, said up-converter comprising an inductor, a capacitor coupled to said inductor, and a first switch including a control gate, said first switch being coupled in parallel with said capacitor and being switchable between a non-conducting state, in which a charging current flows through said capacitor, and a conducting state, in which the charging current is shunted from said capacitor;

detection means for detecting the charging current through said capacitor via a voltage drop across said detection means which voltage drop is caused by the charging current flowing from said capacitor across said detection means; and drive means for controlling the switching of said first switch, said drive means including a monostable multivibrator, coupled to said control gate, for generating a switching signal of a substantially constant time $t_{on}$ at said control gate, said first switch being switched to and kept in the conducting state during the duration of the switching signal at said control gate, a second switch coupled to said monostable multivibrator and coupled to said detection means for blocking said monostable multivibrator from generating the switching signal, whereby said first switch is kept in the non-conducting state, in response to said detection means detecting the charging current, and switching frequency control means for blocking the monostable vibrator from generating the switching signal during a substantially fixed time $t_{off}$ such that the frequency at which said first switch is switched by said monostable vibrator is substantially independent of the voltage of said AC input signal.

18. A circuit arrangement according to claim 17, further comprising current limiting means for limiting current through said first switch, said current limiting means redirecting current through said detection means such that said second switch switches into the conductive state whenever the current through said first switch exceeds a predetermined level causing said monostable vibrator to be blocked from generating the switching signal.

19. The circuit arrangement in accordance with claim 18, wherein said current limiting means includes (i) a resistor coupled between said first switch and ground and (ii) a diode coupled between said first switch and a junction between said capacitor and said detection means for directing current towards said detection means.

20. The circuit arrangement in accordance with claim 19, wherein said detection means includes a diode.

21. The circuit arrangement in accordance with claim 17, wherein said switching frequency control means includes a voltage divider and an impedance connected to said monostable multivibrator.

22. The circuit arrangement in accordance with claim 17, wherein said drive circuitry includes protection means for ensuring that a voltage across said capacitor is insensitive to variations in both the effective voltage of the AC voltage source and the load current.

23. The circuit arrangement in accordance with claim 17, wherein said detection means includes a diode.

24. A circuit arrangement for driving a gas discharge lamp, said circuit arrangement comprising:

an up converter including a ground terminal and an input terminal for receiving an input signal, an inductor having a first end and a second end, said first end of said inductor being coupled to said input terminal, a capacitor having a first end and a second end, said first end of said capacitor being coupled to said second end of said inductor, a first switch having a control gate and a main current path, said main current path being coupled between said second end of said inductor and said ground terminal and being switchable between a non-conducting state in which a charging current flows through said capacitor, and a conducting state in which the charging current is shunted from said capacitor;

detection means, for detecting said charging current through said capacitor via a voltage drop across said detection means which voltage drop is caused by the charging current flowing from said capacitor means across said detection means, having a first end coupled to said ground terminal and a second end coupled to said second end of said capacitor, said detection means including a series connection of diodes such that current flowing through said diodes from said capacitor causes a voltage drop across said diodes; and drive means coupled to said control gate of said first switch for controlling switching of said first switch in dependence on the detection of the charging current through said capacitor by said detection means, and including i) a monostable multivibrator having a reset input, and ii) a second switch switchable into a conductive state and having a base connected to said second end of said capacitor, an emitter connected to the ground terminal and a collector connected to said reset input, the voltage drop across said diodes causing said second switch to switch into the conductive state and reset said monostable multivibrator.

25. The circuit arrangement in accordance with claim 24, wherein said drive means switches said first switch to the conducting state periodically for a substantially constant time $t_{on}$.

26. The circuit arrangement in accordance with claim 25, wherein said drive means maintains said first switch in the non-conducting state for as long as said detection means detects the charging current through said capacitor.

27. A circuit arrangement which extracts a sinusoidal load current from an AC source, comprising:

input terminals for receiving the AC source;

a rectifier coupled to the input terminals for rectifying the sinusoidal load current;

an up-converter having output terminals for providing current to a load such that the sinusoidal load current drawn by said circuit arrangement approximately follows the AC source, said up-converter comprising (i) inductive means for exhibiting inductive characteristics, (ii) capacitive means for being charged by a charging current, and (iii) switching means switchable between a non-conducting and a conducting state for controlling, respectively, charging and discharging of the capacitive means;

drive means for controlling the switching of said switching means; and detection means coupled to said capacitive means for detecting the charging current through said capacitive means via a voltage drop across said detection means which voltage drops is caused by the charging current flowing from said capacitive means across said detection means, said drive means switching said switching means in dependence on the detection of the charging current through said capacitive means by said detection means.

28. A circuit arrangement having inductive means for exhibiting inductive characteristics, capacitive means having a first end and a second end, for being charged by a charging current, the first end being coupled to the inductive means, switching means switchable between a non-conducting and a conducting state for controlling, respectively, charging and discharging of the capacitive means, and drive means for controlling the switching of said switching means, wherein the improvement comprises:

detection means for detecting the charging current through said capacitive means via a voltage drop across said detection means which voltage drop is caused by the charging current flowing from said capacitive means across said detection means, said drive means switching said switching means in dependence on the detection of the charging current through said capacitive means by said detection means, said detection means having a first end coupled to the second end of the capacitive means, and a second end coupled to a constant voltage source, and wherein said drive means includes a first end coupled between the first end of the detection means and the second end of the capacitive means, and a second end coupled to the switching means.

29. The circuit arrangement as claimed in claim 3, wherein said inductive means is coupled to said capacitive means and said switching means such that said inductive means, capacitive means and said switching means form an up-converter.

30. The circuit arrangement as claimed in claim 3, wherein said capacitive means includes a first end coupled to the inductive means and a second end, and wherein said detection means includes a first end coupled to the second end of the capacitive means and a second end coupled to ground, and wherein said drive means includes a first end coupled between the first end of the detection means and the second end of the capacitor, and a second end coupled to the switching means.

31. A circuit arrangement which draws a sinusoidal load current from an AC source, comprising:

input means for receiving the AC source;

inductive means for exhibiting inductive characteristics;

capacitive means coupled to said inductive means for being charged by a charging current;

switching means coupled to said capacitive means and switchable between a non-conducting and a conducting state for controlling, respectively, charging and discharging of said capacitive means, said switching means, said capacitive means and said inductive means forming an up-converter;

drive means for controlling the switching of said switching means; and detection means for detecting the charging current through said capacitive means via a voltage drop across said detection means which voltage drop is caused by the charging current flowing from said capacitive means across said detection means, said drive means switching said switching means in dependence on the voltage drop across said detection means which is indicative of the charging current through said capacitive means.

32. A circuit arrangement comprising:

input terminals for receiving an AC source;

a rectifier for rectifying load current drawn from the AC source;

an up-converter having output terminals for providing current to a load such that the current drawn by said up-converter and said rectifier approximately follows a signal provided by said AC source, the up-converter comprising (i) inductive means for exhibiting inductive characteristics, (ii) capacitive means for being charged by a charging current, and (iii) switching means switchable between a non-conducting and a conducting state for controlling, respectively, charging and discharging of the capacitive means;

drive means for controlling the switching of said switching means; and detection means coupled to said capacitive means for detecting the charging current through said capacitive means via a voltage drop across said detection means which voltage drop is caused by the charging current flowing from said capacitive means across said detection means, said drive means switching said switching means in dependence on the voltage drop across said detection means which is indicative of the charging current through said capacitive means.

33. A circuit arrangement, for drawing a sinusoidal load current from an AC source, comprising:

input means for receiving the AC source;

inductive means for exhibiting inductive characteristics;

capacitive means having a first end and a second end, for being charged by a charging current, the first end being coupled to the inductive means;

switching means switchable between a non-conducting and a conducting state for controlling, respectively, charging and discharging of the capacitive means; and drive means for controlling the switching of said switching means;

detection means for detecting the charging current through said capacitive means via a voltage drop across said detection means which drop is caused by the charging current flowing from said capacitive means across said detection means, said drive means switching said switching means in dependence on the voltage drop across said detection means which is indicative of the charging current through said capacitive means, said detection means having a first end coupled to the second end of the capacitive means, and a second end coupled to a constant voltage source, and wherein said drive means includes a first end coupled between the first end of the detection means and the second end of the capacitive means, and a second end coupled to the switching means.

* * * * *